United States Patent
Quach et al.

(10) Patent No.: US 11,215,059 B1
(45) Date of Patent: Jan. 4, 2022

(54) GAS TURBINE ENGINE AIRFOIL WITH VARIABLE PITCH COOLING HOLES

(71) Applicant: Raytheon Technologies Corporation, Farmington, CT (US)

(72) Inventors: San Quach, Southington, CT (US); Bryan P. Dube, Columbia, CT (US); Raymond Surace, Newington, CT (US); Alex J. Schneider, South Glastonbury, CT (US); Tyler G. Vincent, Portland, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 17/011,171

(22) Filed: Sep. 3, 2020

(51) Int. Cl.
  *F01D 5/18* (2006.01)
  *F01D 25/12* (2006.01)
  *F02C 3/04* (2006.01)

(52) U.S. Cl.
  CPC ............... *F01D 5/186* (2013.01); *F01D 5/18* (2013.01); *F01D 25/12* (2013.01); *F02C 3/04* (2013.01); *F05D 2220/323* (2013.01); *F05D 2220/36* (2013.01); *F05D 2240/303* (2013.01); *F05D 2240/304* (2013.01); *F05D 2240/35* (2013.01); *F05D 2260/202* (2013.01); *F05D 2300/6033* (2013.01)

(58) Field of Classification Search
  CPC . F01D 5/18; F01D 5/186; F01D 5/189; F01D 9/041; F01D 25/12; F05D 2220/32; F05D 2240/12; F05D 2240/122; F05D 2240/124; F05D 2240/30; F05D 2260/201; F05D 2260/202; Y02T 50/672; Y02T 50/676
  See application file for complete search history.

(56) References Cited

U.S. PATENT DOCUMENTS

| 5,503,529 | A | 4/1996 | Anselmi et al. | |
| 7,249,934 | B2 * | 7/2007 | Palmer | F01D 5/20 416/97 R |
| 7,686,580 | B2 * | 3/2010 | Cunha | F01D 5/186 416/97 R |
| 9,482,098 | B2 | 11/2016 | Quach et al. | |
| 10,125,614 | B2 * | 11/2018 | Mongillo | F01D 5/186 |
| 10,247,011 | B2 | 4/2019 | Quach et al. | |
| 10,641,103 | B2 | 5/2020 | Spangler | |
| 2004/0202542 | A1 * | 10/2004 | Cunha | F01D 5/187 416/97 R |
| 2014/0010632 | A1 * | 1/2014 | Spangler | F01D 5/186 415/115 |

(Continued)

*Primary Examiner* — Woody A Lee, Jr.
*Assistant Examiner* — Brian Christopher Delrue
(74) *Attorney, Agent, or Firm* — Carlson, Gaskey & Olds, P.C.

(57) ABSTRACT

An airfoil includes a ceramic airfoil section that defines leading and trailing edges, pressure and suction sides, and radially inner and outer ends. The span of the airfoil section has first, second, and third radial span zones. There is a row of cooling holes in an aft 25% of the axial span. The row of cooling holes extends though the first, second, and third radial span zones. The cooling holes in the first radial span zone define a first pitch P1, the cooling holes in the second radial span zone define a second pitch P2, and the cooling holes in the third radial span zone define a third pitch P3, wherein P2<P3<P1.

18 Claims, 6 Drawing Sheets

(56) References Cited

U.S. PATENT DOCUMENTS

2015/0300258 A1* 10/2015 Mongillo ............... F01D 5/186
             60/726
2016/0237850 A1   8/2016  Chakka et al.
2017/0234142 A1   8/2017  Benson et al.

* cited by examiner

GAS TURBINE ENGINE AIRFOIL WITH VARIABLE PITCH COOLING HOLES

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

An airfoil for a gas turbine engine according to an example of the present disclosure includes a ceramic airfoil section that defines leading and trailing edges, pressure and suction sides, and radially inner and outer ends. The airfoil section has a radial span from the radially inner end to the radially outer end and an axial span from the leading edge to the trailing edge. The radial span has, consecutively from the radially inner end to the radially outer end, first, second, and third radial span zones. A row of cooling holes in an aft 25% of the axial span, extend though the first, second, and third radial span zones. The cooling holes in the first radial span zone define a first pitch P1, the cooling holes in the second radial span zone define a second pitch P2, and the cooling holes in the third radial span zone define a third pitch P3, wherein P2<P3<P1.

In a further embodiment of any of the foregoing embodiments, P3 is greater than P2 by a multiplier factor of 1.1 to 1.5, and P1 is greater than P2 by a multiplier factor of greater than 1.5 to 5.

In a further embodiment of any of the foregoing embodiments, the row of cooling holes is in either the pressure side or the suction side.

In a further embodiment of any of the foregoing embodiments, there is additionally a row of trailing edge cooling holes in the trailing edge that are of hole diameter D1, and the trailing edge cooling holes have a constant pitch P4 such that P4/D1 is greater than 4.

In a further embodiment of any of the foregoing embodiments, there is additionally a row of trailing edge cooling holes in the trailing edge that also extend though the first, second, and third radial span zones, and the trailing edge cooling holes in the first radial span zone also have the first pitch P1. The trailing edge cooling holes in the second radial span zone also have the second pitch P2, and the trailing edge cooling holes in the third radial span zone also have the third pitch.

In a further embodiment of any of the foregoing embodiments, the row of trailing edge cooling holes is radially offset from the row of cooling holes that is in either the pressure side or the suction side.

In a further embodiment of any of the foregoing embodiments, the cooling holes in either the pressure side or the suction side are axially staggered.

In a further embodiment of any of the foregoing embodiments, the row of cooling holes is a row of trailing edge cooling holes in the trailing edge.

In a further embodiment of any of the foregoing embodiments, there is additionally a row of side cooling holes in either the pressure side or the suction side that also extend though the first, second, and third radial span zones, and the side cooling holes in the first radial span zone also have the first pitch P1. The side cooling holes in the second radial span zone also have the second pitch P2, and the side cooling holes in the third radial span zone also have the third pitch.

In a further embodiment of any of the foregoing embodiments, the row of trailing edge cooling holes is radially offset from the row of side cooling holes that is in either the pressure side or the suction side.

In a further embodiment of any of the foregoing embodiments, the side cooling holes are axially staggered.

In a further embodiment of any of the foregoing embodiments, the first, second, and third radial span zones have, respectively, absolute radial heights H1, H2, and H3 taken as a percent of the span, and H1, H2, and H3 differ from each other by no more than 15%.

In a further embodiment of any of the foregoing embodiments, the cooling holes lie in a common radial line.

In a further embodiment of any of the foregoing embodiments, P3 is greater than P2 by a multiplier factor of 2.2 to 3, and P1 is greater than P2 by a multiplier factor of 3 to 10.

A gas turbine engine according to an example of the present disclosure includes a compressor section, a combustor in fluid communication with the compressor section, and a turbine section in fluid communication with the combustor. The turbine section has an airfoil that includes a ceramic airfoil section that defines leading and trailing edges, pressure and suction sides, and radially inner and outer ends. The airfoil body has a radial span from the radially inner end to the radially outer end and an axial span from the leading edge to the trailing edge. The radial span has, consecutively from the radially inner end to the radially outer end, first, second, and third radial span zones. A row of cooling holes in an aft 25% of the axial span, extend though the first, second, and third radial span zones. The cooling holes in the first radial span zone define a first pitch P1, the cooling holes in the second radial span zone define a second pitch P2, and the cooling holes in the third radial span zone define a third pitch P3, wherein P2<P3<P1.

In a further embodiment of any of the foregoing embodiments, P3 is greater than P2 by a multiplier factor of 1.1 to 1.5, and P1 is greater than P2 by a multiplier factor of greater than 1.5 to 5.

In a further embodiment of any of the foregoing embodiments, the row of cooling holes is in either the pressure side or the suction side.

In a further embodiment of any of the foregoing embodiments, the row of cooling holes is a row of trailing edge cooling holes in the trailing edge.

In a further embodiment of any of the foregoing embodiments, the first, second, and third radial span zones have, respectively, absolute radial heights H1, H2, and H3 taken a percent of the span, and H1, H2, and H3 differ from each other by no more than 15%.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
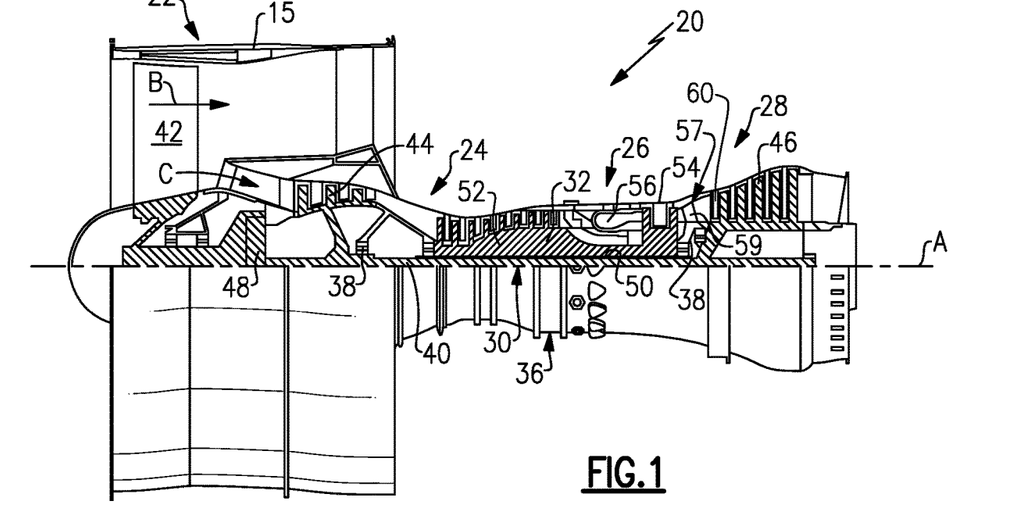
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
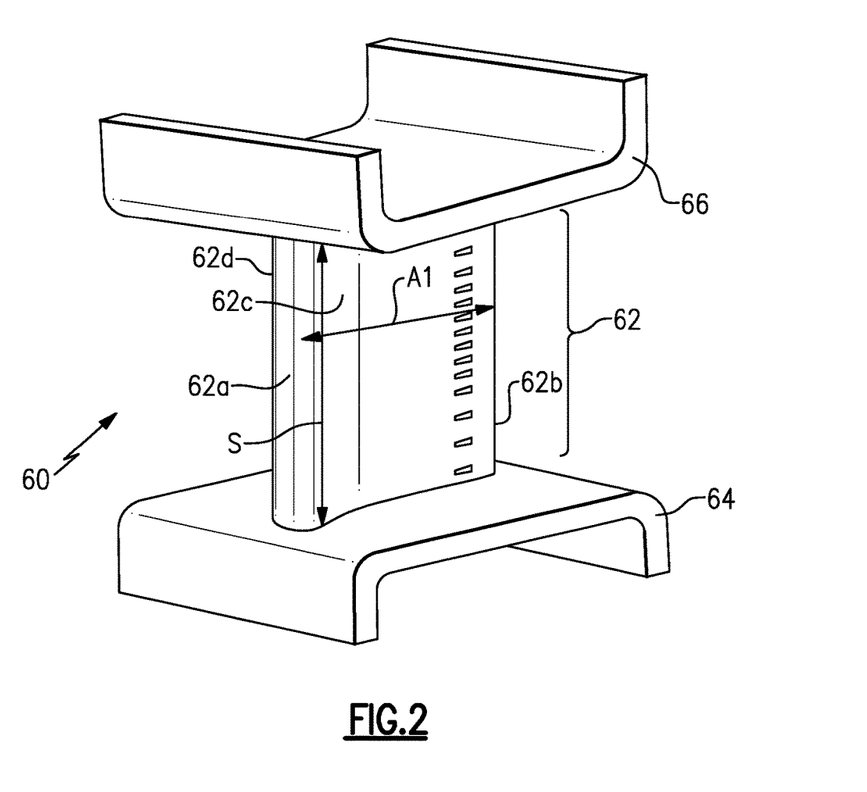
FIG. 2 illustrates an airfoil from the engine.

FIG. 2 illustrates a representative example of an airfoil 60 from the turbine section 28 of the engine 20 (see also FIG. 1). In the illustrated example, the airfoil 60 is a turbine vane. It is to be understood, however, that the examples herein are also applicable to turbine blades.

The airfoil 60 includes a ceramic airfoil section 62 that defines a leading edge 62a, a trailing edge 62b, and first and second sides 62c/62d that join the leading edge 64a and the trailing edge 64b. In this example, the first side 64c is a pressure side and the second side 64d is a suction side. The ceramic airfoil section 62 generally extends in a radial direction relative to the central engine axis A. For a vane, the ceramic airfoil section 62 spans from a first end at an inner platform 64 to a second end at an outer platform 66. The terms "inner" and "outer" refer to location with respect to the central engine axis A, i.e., radially inner or radially outer. For a blade, the ceramic airfoil section 62 would extend from a single inner platform to an outer, free end. In this regard, the airfoil section 62 defines a radial span, S, from its inner end at the inner platform 64 to its outer end at the outer platform 66. There is also an axial span, A1, from the leading edge 62a to the trailing edge 62b. In these regards, positions in the span-wise direction are indicated as a percentage of the full span, from 0% span at the inner end of the airfoil section 62 to 100% span at the outer end of the airfoil section 62. Positions in the axial direction are indicated as a percentage of the axial span, from 0% axial span at the leading edge 62a of the airfoil section 62 to 100% axial span at the trailing edge 62b.

Figure 3:
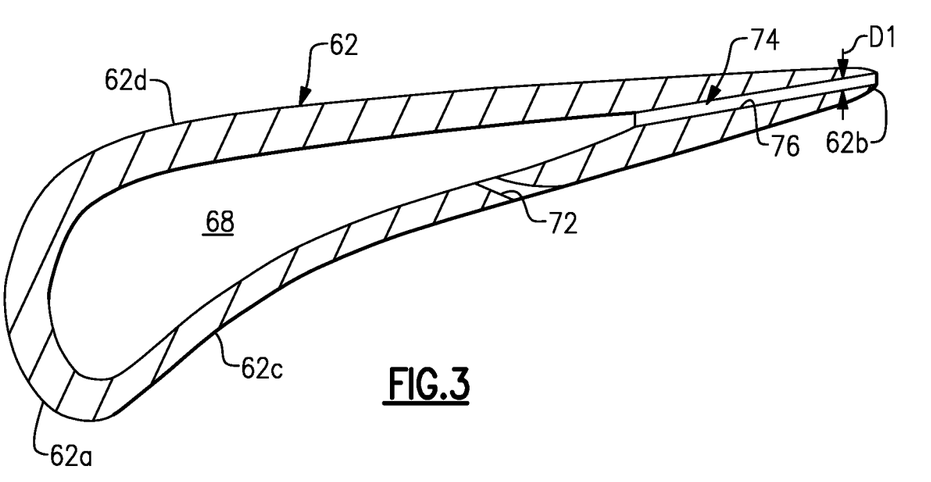
FIG. 3 illustrates a sectioned view of an airfoil.

As shown in an exemplary sectioned view in FIG. 3, the ceramic airfoil section 62 circumscribes an interior cavity 68 for receiving cooling air, such as bleed air from the compressor section 24. The cooling air may be provided through a port or ports in one or both of the platforms 64/66. Although not shown in the illustrated example, the ceramic airfoil section 62 may include one or more ribs/walls that that divide the interior cavity 68 into sub-cavities/passages.

As the nomenclature indicates, the ceramic airfoil section 62 is formed of a ceramic material. In the illustrated example, the airfoil section 62 is integrally formed with the platforms 64/66, which are thus formed of the same ceramic material. For example, the ceramic material is a monolithic ceramic, a ceramic matrix composite ("CMC"), or a combination thereof. CMCs are comprised of a ceramic reinforcement, which is usually ceramic fibers, in a ceramic matrix. A monolithic ceramic does not contain reinforcement and may be a solid poly- or mono-crystalline ceramic. Example monolithic ceramics are, but are not limited to, silicon-containing monolithic ceramics. Example silicon-containing monolithic ceramics are, but are not limited to, silicon carbide (SiC) monolithic ceramic or silicon nitride ($Si_3N_4$) monolithic ceramic. Example ceramic matrices of the CMC are silicon-containing ceramics, such as but not limited to, a silicon carbide (SiC) matrix or silicon nitride ($Si_3N_4$) matrix. Example ceramic reinforcement of the CMC are silicon-containing ceramic fibers, such as but not limited to, silicon carbide (SiC) fibers or silicon nitride ($Si_3N_4$) fibers.

Figure 4:
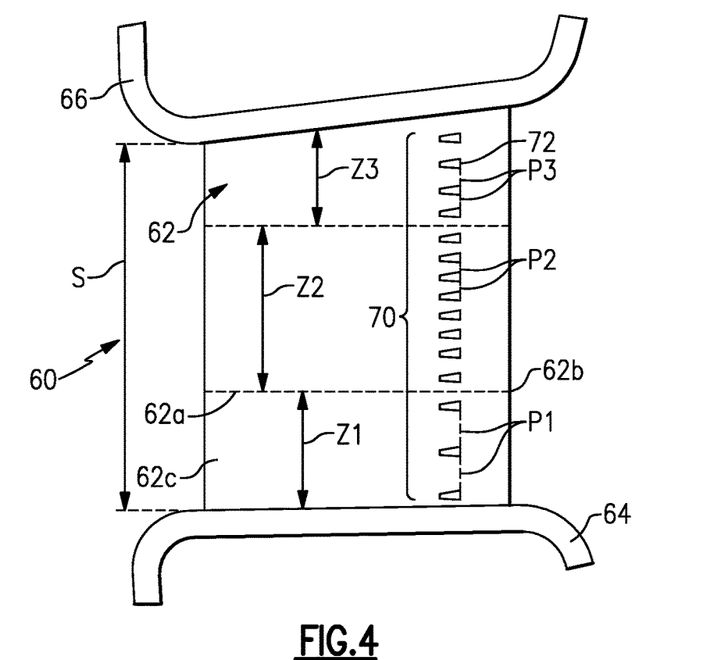
FIG. 4 illustrates a circumferential view of an airfoil with variable pitch cooling holes.

Referring also to the circumferential view in FIG. 4, the airfoil section includes a row 70 of cooling holes 72, which may also be referred to herein as side cooling holes to indicate their location on the pressure or suction side 62c/62d. As shown, the row 70 of cooling holes 72 is on the pressure side 62c, however, it is to be understood that the examples herein are also applicable to side cooling holes on the suction side 62d. The airfoil section 62 may additionally or alternatively include a row 74 of cooling holes 76 (FIG. 3) in the trailing edge 62b, examples of which will be described later below. These may also be referred to as trailing end cooling holes. As will be appreciated, airfoil embodiments herein may have the exemplary row of cooling holes only on the pressure side 62c, only on the suction side 62d, only in the trailing edge 62b, or on combinations of only the pressure side 62c/suction side 62d, only the pressure side 62c/trailing edge 62b, only the suction side 62d/trailing edge 62b, or on each of the pressure side 62c/suction side 62d/trailing edge.

In general, vanes that are formed of superalloys employ a thermal management strategy that involves cooling the vane as much as possible, to avoid exceeding the temperature limit of the superalloy and to limit effects of creep and fatigue, without much regard to thermally induced internal stresses, as the superalloy strength/toughness enables this to be a secondary concern. This paradigm dictates a strategy of using many cooling holes to maximize cooling. Ceramic materials, however, have higher maximum use temperatures in comparison to metallic superalloys. Therefore, vanes formed of ceramic materials have no need to employ the same thermal management strategy that is used for superalloy vanes.

Additionally, ceramic materials have significantly lower thermal conductivity than superalloys and do not possess the same strength and ductility characteristics, making them more susceptible to distress from thermal gradients and the thermally induced stresses those cause. The high strength and toughness of superalloys permits resistance to thermal stresses. Ceramics, however, by comparison are more prone to distress from thermal stresses at relatively weak locations, such as in interlaminar interfaces between fiber plies in a CMC or at high radius wall surfaces. Therefore, although maximum cooling may be desirable for superalloy vanes, maximized cooling of a ceramic vane may exacerbate thermal gradients and thus be counter-productive to meeting durability goals. In this regard, the exemplary row of cooling holes described herein in the pressure side 62c, suction side 62d, and/or trailing edge 62b are configured to facilitate thermal management and durability of ceramic materials rather than maximize cooling as for a superalloy.

As an example, the temperature of the gas stream in the core gaspath at the inlet to the airfoil section 62 varies across the span-wise (radial) direction (e.g., at cruise). Such temperature variation can be determined experimentally and/or by computer simulation. For instance, the temperature of the gas stream may be lowest at approximately 0% span and gradually increase over the radially inner portion of the airfoil section 62. The temperature may then spike to a peak temperature near the middle portion of the airfoil section 62 and then gradually decrease or plateau to the 100% span in the radially outer portion of the airfoil section 62. Such a thermal profile indicates three distinct temperature zones: a first zone where the temperature gradually increases over the inner portion of the airfoil section 62, a second zone where the temperature spikes in the middle portion of the airfoil section 62, and a third zone where the temperature gradually decreases or plateaus in the outer portion of the airfoil section 62. These temperature zones, in turn, correspond to three radial span zones of the airfoil section 62, indicated as Z1, Z2, and Z3 in FIG. 4.

The zones Z1, Z2, and Z3 are consecutive from the radially inner end of the airfoil section 62 to the radially outer end of the airfoil section, i.e., Z1 is bound by the radially inner end and Z2, Z2 is bound by Z1 and Z3, and Z3 is bound by Z2 and the radially outer end. In one example, the boundary between Z1 and Z2 is at 40% span+/−10% and the boundary between Z2 and Z3 is at 75% span+/−10%. Additionally, the inner and outer span bounds of each zone Z1, Z2, and Z3 define an absolute radial height for each zone, which are referred to as H1, H2, and H3. For instance, if Z2 has an outer bound of 75% span and an inner bound of 40% span, its absolute radial height is 35% (75%−

40%=35%). In further examples, H1, H2, and H3 differ from each other by no more than 15%.

Figure 5:
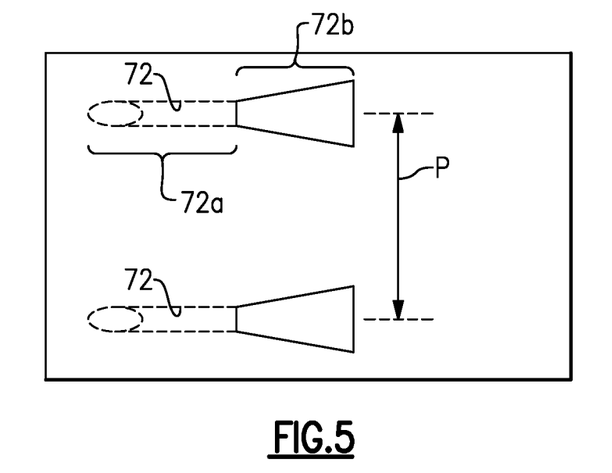
FIG. 5 illustrates pitch between cooling holes.

To facilitate thermal management and durability for such a temperature profile, the row 70 of cooling holes 72 has a variable pitch. The "pitch" refers to the regular spacing between three or more consecutive cooling holes. As an example in FIG. 5, the pitch is taken with regard to the same relative reference locations on the cooling holes 72. For instance, the cooling holes 72 here each have a metering section 72a and a diffuser section 72b. The pitch, P, is taken as the distance in the radial direction from the corner edge of one diffuser section to the same corner edge on the diffuser section 72b of the next cooling hole 72. It is to be understood, however, that other equivalent reference locations are possible as long as they use the same relative location on each cooling hole 72. Moreover, the cooling holes 72 are not limited to the geometry shown and, for example, may exclude diffuser sections and/or have other cross-sectional shapes.

Referring again to FIG. 4, the row 70 of cooling holes 72 extends through each of the zones Z1/Z2/Z3 and is in an aft 25% of the axial span. The cooling holes 72 in the zone Z1 define a first pitch P1, the cooling holes 72 in the zone Z2 define a second pitch P2, and the cooling holes 72 in the zone Z3 define a third pitch P3. The pitches P1/P2/P3 are different from each other such that P1 is greater than P3 and P3 is greater than P2 (i.e., P2<P3<P1).

Such a variable pitch configuration facilitates thermal management. For instance, in the zone Z2 where the temperature of the gas stream is expected to be highest, the pitch P2 is smallest (in comparison to P1 and P3). Thus, relative to the zones Z1 and Z3 there is a greater number of cooling holes 72 and a tighter spacing between the cooling holes 72 in order to provide a larger amount of cooling air (flow) for increased film cooling. In the zone Z1 where the temperature of the gas stream is expected to be lowest, the pitch P1 is largest (in comparison to P2 and P3). Thus, relative to the zones Z2 and Z3 there are fewer cooling holes 72 and a wider spacing between the cooling holes 72 in order to provide a relatively low amount of cooling air for film cooling. In the zone Z3 where the temperature of the gas stream is expected to be intermediate the highest and the lowest temperatures, the pitch P3 is intermediate (in comparison to P1 and P2). Thus, relative to the zones Z1 and Z2 there is an intermediate number of cooling holes 72 and an intermediate spacing between the cooling holes 72 in order to provide an intermediate amount of cooling air for film cooling.

In a further example, the pitches P1/P2/P3 are related by multiplier factors. The pitch P2 serves as a reference, and P1 and P3 are larger than P2 by respective multiplier factors. For instance, P3 is larger than P2 by a multiplier factor of 1.1 to 1.5, and P1 is larger than P2 by a multiplier factor of 1.5 to 5. Therefore, for example, if P2 equals 0.5 millimeters, P3 would be 0.65 millimeters if the multiplier factor is 1.3 (0.5 millimeters×1.3=0.65 millimeters). Similarly, if P2 equals 0.5 millimeters, P1 would be 1.5 millimeters if the multiplier factor is 3 (0.5 millimeters×3=1.5 millimeters). As will be appreciated, equivalent pitches can instead be expressed with either P1 or P3 as the reference. Moreover, given this disclosure, one of ordinary skill in the art will be able to determine appropriate multiplier factors that are commensurate with their gas stream temperature profile and cooling flow properties.

The following examples demonstrate additional variations with regard to the configuration, location, and/or presence of cooling holes. In this regard, it is to be understood that the examples below incorporate the examples from above, including but not limited to the zones Z1/Z2/Z3, zone boundaries, absolute zone heights, pitches P1/P2/P3, and multiplier factors. Where appropriate, like reference numerals are used to designate like elements and reference numerals with the addition of one-hundred or multiples thereof designate modified elements that are understood to incorporate the same features and benefits of the corresponding elements.

Figure 6:
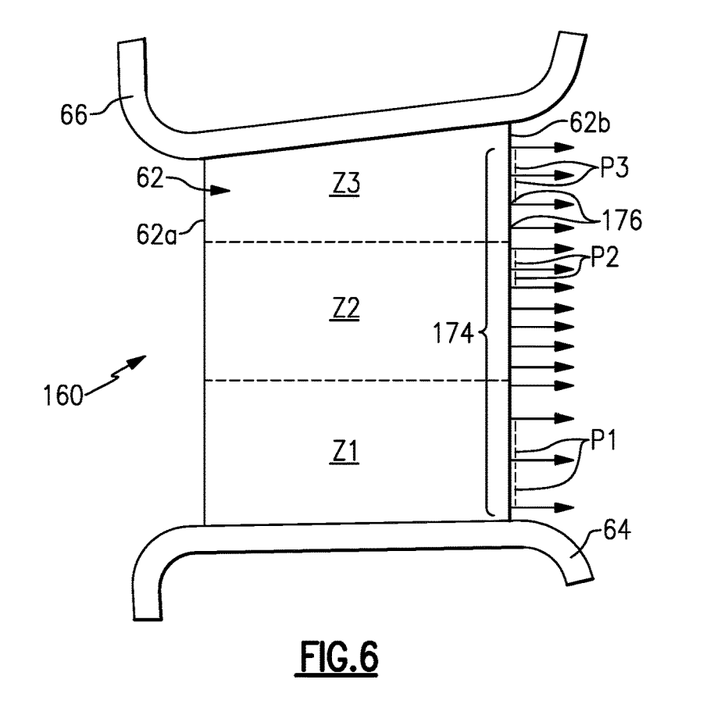
FIG. 6 illustrates an example airfoil with variable pitch cooling holes in the trailing edge.

In the airfoil 160 of FIG. 6, the row 174 of cooling holes 176 (represented at the depicted flow arrows; see equivalent holes 76 in FIG. 3) is in the trailing edge 62b rather than on the pressure side 62c as in FIG. 4. The row 174 of cooling holes 176 otherwise has the pitches P1/P2/P3 and multiplier factors as discussed above.

Figure 7:
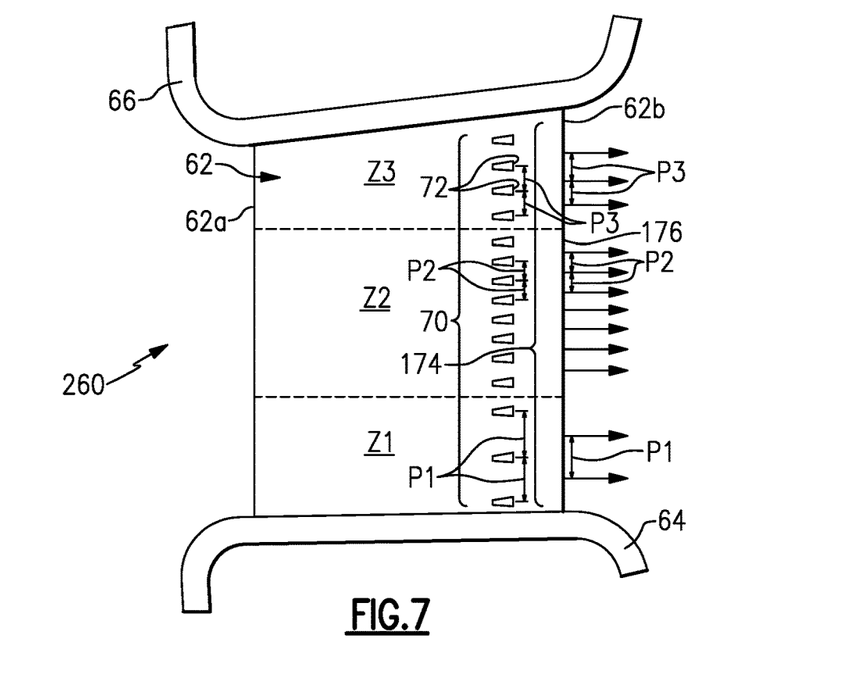
FIG. 7 illustrates an example airfoil with variable pitch cooling holes on the side and in the trailing edge.

The airfoil 260 in FIG. 7 is combination FIGS. 4 and 6 and thus has both the row 70 of cooling holes 72 and the row 174 of cooling holes 176. In this example, the row 174 of cooling holes 176 is radially offset from the row 70 of cooling holes 72. For instance, the row 174 has a one-half offset such that in each zone Z1/Z2/Z3 the cooling holes 176 are radially half-way between two of the cooling holes 72 in the same zone Z1/Z2/Z3. The offset facilitates providing film cooling from the cooling holes 72 to the surface regions between the cooling holes 176. The offset may also facilitate a distribution of the cooling holes that is relatively far apart in order to limit debits to strength yet maintain good film cooling.

Figure 8:
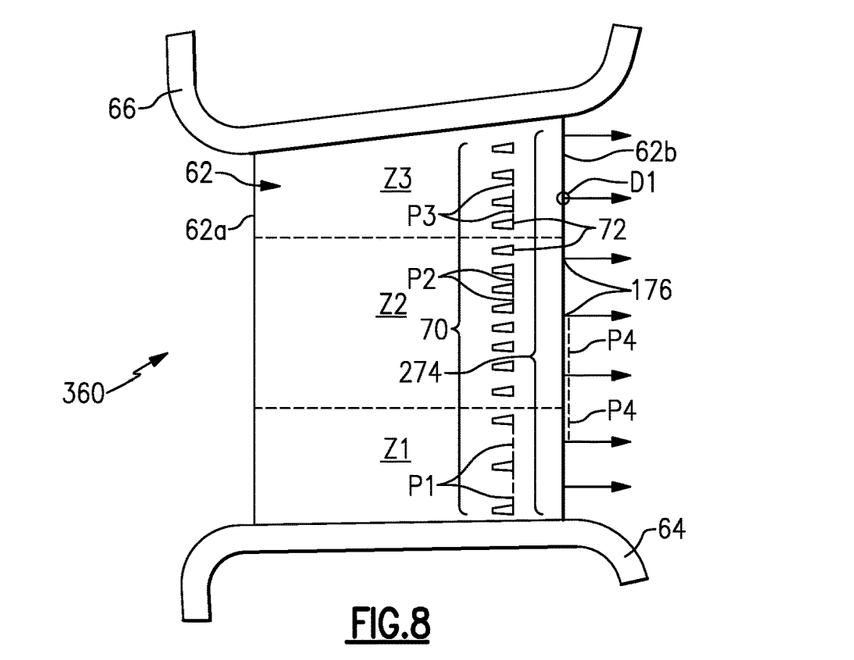
FIG. 8 illustrates an example airfoil with variable pitch cooling holes on the side and constant pitch cooling holes in the trailing edge.

The airfoil 360 in FIG. 8 is similar to that of FIG. 7 except that rather than having the pitches P1/P2/P3 and multiplier factors as discussed above, the row 274 of cooling holes 176 has a constant pitch P4. Additionally, the cooling holes 176 are of hole diameter D1 such that P4/D1 is greater than 4 (i.e., using the same units, such as millimeters). More typically, however, the ratio P4/D1 will be no greater than about 10. Such a spacing facilitates a distribution of the cooling holes that is relatively far apart in order to limit debits to strength yet maintain good film cooling.

Figure 9:
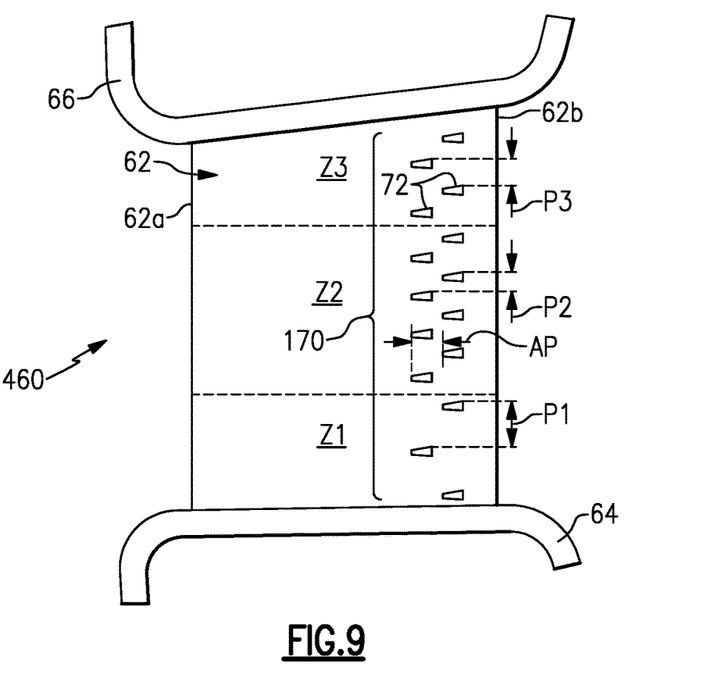
FIG. 9 illustrates an example airfoil with variable pitch cooling holes that are axially staggered.

The airfoil 460 in FIG. 9 is similar to that of FIG. 4 except that that cooling holes 72 in the row 170 are axially staggered (in FIG. 4 the row 70 is radially straight). For instance, the cooling holes 72 of the row 170 have an axial pitch, AP, and the AP is greater than the diameter of the cooling holes 72 by a factor of at least 4. Alternatively, the staggered row 170 can be considered to be two neighboring straight rows in which one row is radially offset from the other by one-half of the radial pitch.

Figure 10:
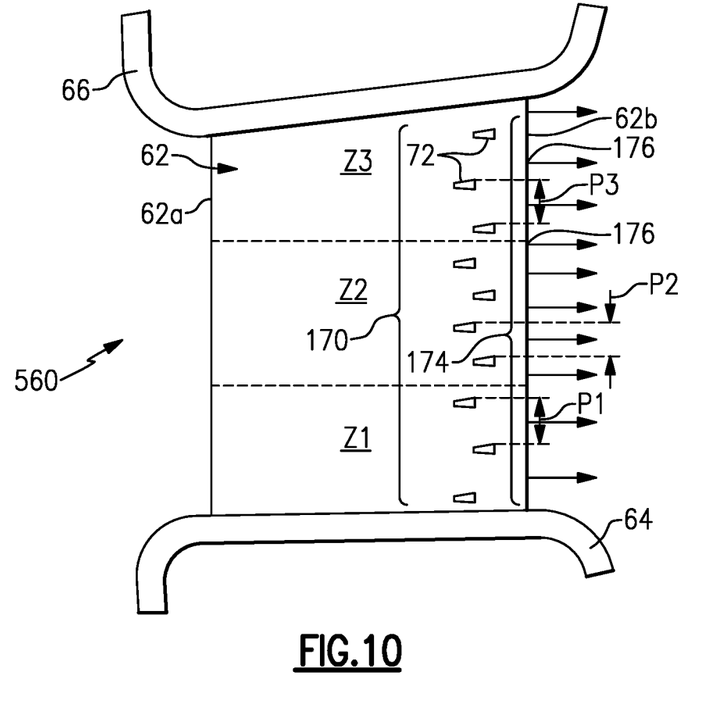
FIG. 10 illustrates an example airfoil with variable pitch cooling holes that are axially staggered and variable pitch cooling holes in the trailing edge.

The airfoil 560 in FIG. 10 is similar to that of FIG. 7 except with larger multiplier factors. For instance, P3 is greater than P2 by a multiplier factor of 2.2 to 3, and P1 is greater than P2 by a multiplier factor of 3 to 10. Such multiplier factors may be used for an airfoil that has relatively lower average heat loads.

Figure 11:
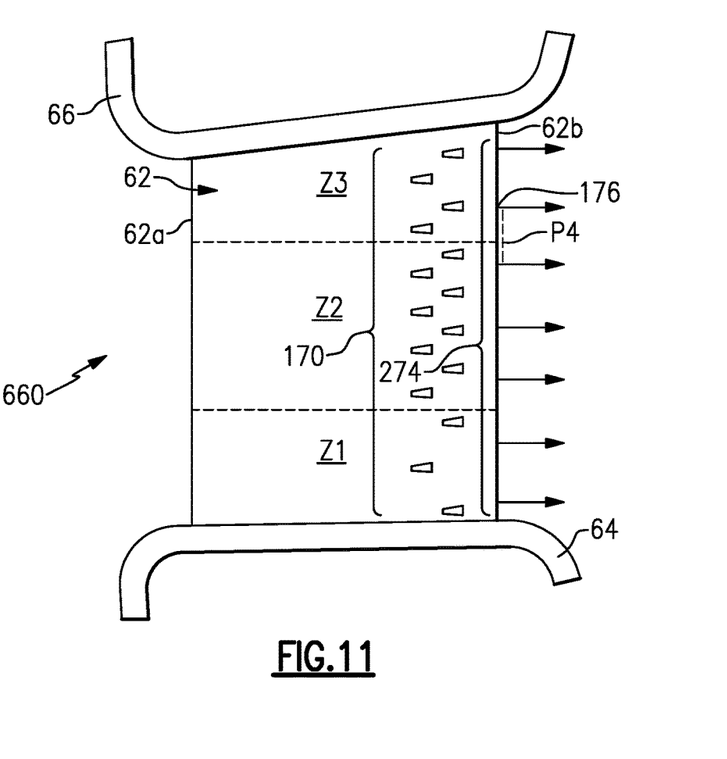
FIG. 11 illustrates an example airfoil with variable pitch cooling holes that are axially staggered and constant pitch cooling holes in the trailing edge.

The airfoil 660 in FIG. 11 is similar to that of FIG. 7 except that instead of the row 174 with variable pitch, the airfoil 660 has the row 274 of cooling holes 176 with the constant pitch P4 as in FIG. 8.

As will be appreciated form this disclosure, the examples herein may be used to facilitate thermal management and durability. For example, film effectiveness may be enhanced, temperatures lowered, through-thickness gradients lowered, transient thermal gradients lowered, durability (e.g., oxidation, recession, coating spall, structural capability), and/or cooling air usage reduced.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil for a gas turbine engine, comprising:
    a ceramic airfoil section defining leading and trailing edges, pressure and suction sides, and radially inner and outer ends, the airfoil section having a radial span from the radially inner end to the radially outer end and an axial span from the leading edge to the trailing edge, the span having, consecutively from the radially inner end to the radially outer end, first, second, and third radial span zones; and
    a row of cooling holes in an aft 25% of the axial span, the row of cooling holes extending though the first, second, and third radial span zones, the cooling holes in the first radial span zone defining a first pitch P1, the cooling holes in the second radial span zone defining a second pitch P2, and the cooling holes in the third radial span zone defining a third pitch P3, wherein P2<P3<P1;
    wherein the cooling holes lie in a common radial line.

2. The airfoil as recited in claim 1, wherein P3 is greater than P2 by a multiplier factor of 1.1 to 1.5, and P1 is greater than P2 by a multiplier factor of greater than 1.5 to 5.

3. The airfoil as recited in claim 2, wherein the row of cooling holes is in either the pressure side or the suction side.

4. The airfoil as recited in claim 3, wherein there is additionally a row of trailing edge cooling holes in the trailing edge that are of hole diameter D1, and the trailing edge cooling holes have a constant pitch P4 such that P4/D1 is greater than 4.

5. The airfoil as recited in claim 3, wherein there is additionally a row of trailing edge cooling holes in the trailing edge that also extend though the first, second, and third radial span zones, and the trailing edge cooling holes in the first radial span zone also have the first pitch P1, the trailing edge cooling holes in the second radial span zone also have the second pitch P2, and the trailing edge cooling holes in the third radial span zone also have the third pitch.

6. The airfoil as recited in claim 5, wherein the row of trailing edge cooling holes is radially offset from the row of cooling holes that is in either the pressure side or the suction side.

7. The airfoil as recited in claim 5, wherein the cooling holes in either the pressure side or the suction side are axially staggered.

8. The airfoil as recited in claim 2, wherein the row of cooling holes is a row of trailing edge cooling holes in the trailing edge.

9. The airfoil as recited in claim 8, wherein there is additionally a row of side cooling holes in either the pressure side or the suction side that also extend though the first, second, and third radial span zones, and the side cooling holes in the first radial span zone also have the first pitch P1, the side cooling holes in the second radial span zone also have the second pitch P2, and the side cooling holes in the third radial span zone also have the third pitch.

10. The airfoil as recited in claim 9, wherein the row of trailing edge cooling holes is radially offset from the row of side cooling holes that is in either the pressure side or the suction side.

11. The airfoil as recited in claim 10, wherein the side cooling holes are axially staggered.

12. The airfoil as recited in claim 1, wherein the first, second, and third radial span zones have, respectively, absolute radial heights H1, H2, and H3 taken as a percent of the span, and H1, H2, and H3 differ from each other by no more than 15%.

13. The airfoil as recited in claim 1, wherein P3 is greater than P2 by a multiplier factor of 2.2 to 3, and P1 is greater than P2 by a multiplier factor of 3 to 10.

14. A gas turbine engine comprising:
    a compressor section;
    a combustor in fluid communication with the compressor section; and
    a turbine section in fluid communication with the combustor, the turbine section having an airfoil that includes a ceramic airfoil section defining leading and trailing edges, pressure and suction sides, and radially inner and outer ends, the airfoil body having a radial span from the radially inner end to the radially outer end and an axial span from the leading edge to the trailing edge, the span having, consecutively from the radially inner end to the radially outer end, first, second, and third radial span zones, and
    a row of cooling holes in an aft 25% of the axial span, the row of cooling holes extending though the first, second, and third radial span zones, the cooling holes in the first radial span zone defining a first pitch P1, the cooling holes in the second radial span zone defining a second pitch P2, and the cooling holes in the third radial span zone defining a third pitch P3, wherein P2<P3<P1;
    wherein the cooling holes lie in a common radial line.

15. The engine as recited in claim 13, wherein P3 is greater than P2 by a multiplier factor of 1.1 to 1.5, and P1 is greater than P2 by a multiplier factor of greater than 1.5 to 5.

16. The engine as recited in claim 15, wherein the row of cooling holes is in either the pressure side or the suction side.

17. The engine as recited in claim 15, wherein the row of cooling holes is a row of trailing edge cooling holes in the trailing edge.

18. The engine as recited in claim 15, wherein the first, second, and third radial span zones have, respectively, absolute radial heights H1, H2, and H3 taken a percent of the span, and H1, H2, and H3 differ from each other by no more than 15%.

* * * * *